H. E. SMITH
Combined Corn Sheller and Grain Fan.
No. 22,689.
Patented Jan'y 18, 1859.
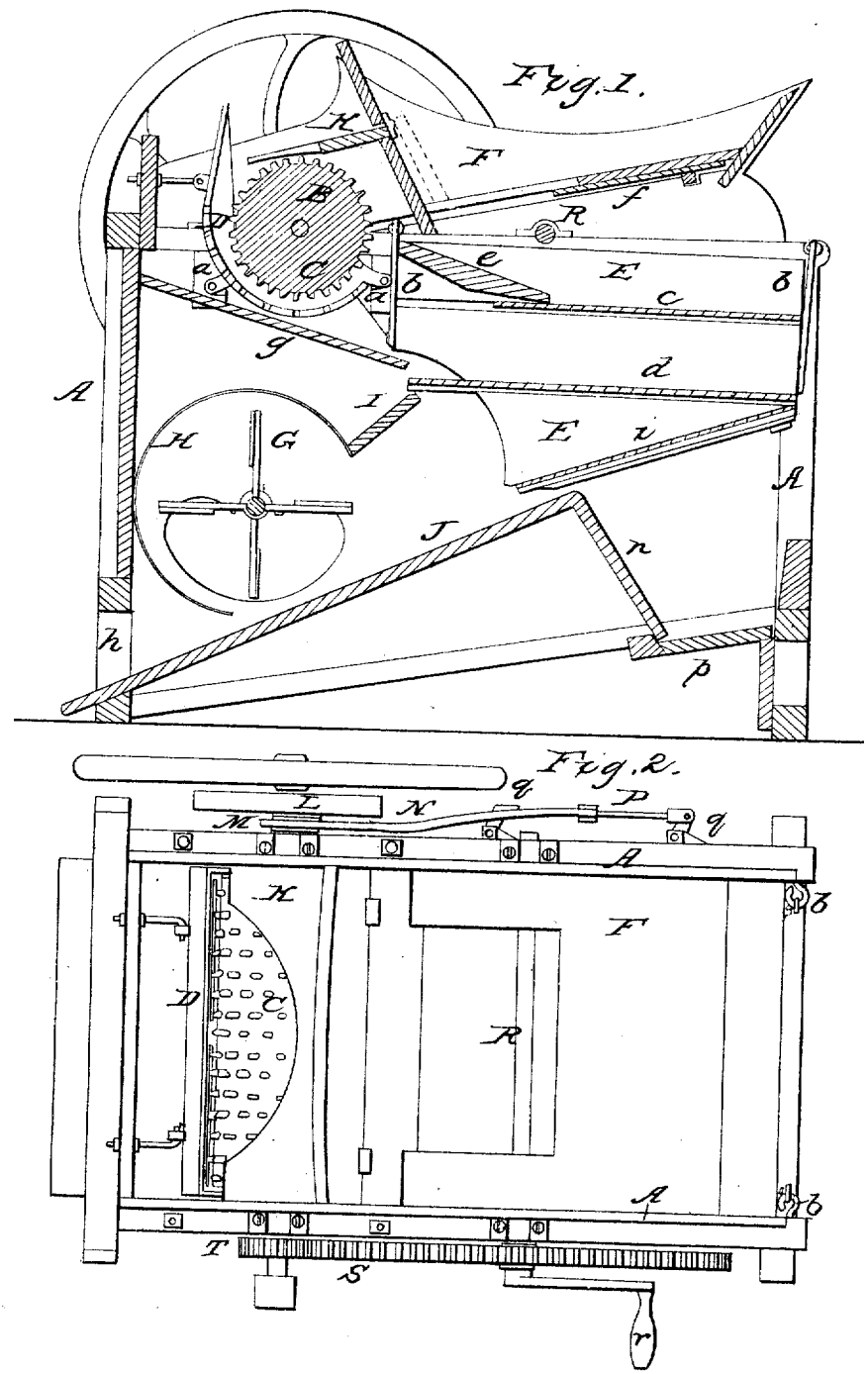

UNITED STATES PATENT OFFICE.

HAMILTON E. SMITH, OF PHILADELPHIA, PENNSYLVANIA, ASSIGNOR TO HIMSELF, AND D. B. NELSON, OF CORTLAND COUNTY, NEW YORK, AND JNO. L. MYERS, OF CHEMUNG COUNTY, NEW YORK.

GRAIN-FAN AND CORN-SHELLER.

Specification of Letters Patent No. 22,689, dated January 18, 1859.

*To all whom it may concern:*

Be it known that I, HAMILTON E. SMITH, of the city and county of Philadelphia and State of Pennsylvania, have invented a new and useful Combination of a Grain-Fan and Corn-Sheller; and I do hereby declare the following to be a full, clear, and exact description of the same, reference being had to the accompanying drawing and to the letters of reference marked thereon.

My invention consists in arranging the spiked roller and slotted shield or concave of a corn-sheller on the frame of a grain fan, in respect to and in combination with the sieve frame blower and an inclined plane of the said grain fan in the manner set forth hereafter so that the said sieve frame, blower and inclined plane of the said corn-sheller may serve the purpose of separating the cob from the shelled kernels of the corn, and the latter from the chaff and other refuse, thereby forming a machine capable of either shelling corn or cleaning grain.

In order to enable others to make and use my invention, I will now proceed to describe its construction and operation.

On reference to the accompanying drawing, which forms a part of this specification; Figure 1, is a sectional elevation of my improved corn sheller and grain fan combined. Fig. 2, a ground plan of the same.

Similar letters refer to similar parts in both views.

A represents a box framing, on the top of which in suitable boxes turns a shaft B, and to the latter is secured the spiked roller C.

D is a slotted shield, attached at $a$, $a$, to springs, one of which is situated on each side of and secured to the frame, so that the shield may yield from the roller to a limited extent.

E is the sieve frame, hung at the back and front, by means of rods $b$, $b$, to staples secured to the opposite sides of the box frame of the machine. To the sieve frame are attached three sieves $c$, $d$ and $i$, the lowest having meshes so fine, that the grain can not pass through them. An inclined plane $e$ is secured to the sieve frame, and is so situated, as to receive the grain, which falls through an opening in the hopper F, a door $f$ being arranged to slide underneath the hopper, so as to close or expose the opening at pleasure. Underneath the shield D, and attached to the frame, is another inclined plane $g$, so situated, that the corn, dropping through the slots of the shield, and the stripped cobs discharged from between the shield and the roller, shall slide down the plane onto the middle sieve $d$.

G is an ordinary fan blower, partially inclosed within a casing H, the blast being directed to the underside of the sieve $d$ by a shelf I and an inclined plane J. The upper end of the latter terminates at a point below the lower sieve $i$, where it meets another inclined plane $n$, which serves to direct the "cockle" and other refuse, which falls through the lowest sieve $i$, onto a platform $p$, which is arranged to slide in and out of the frame.

It will be observed, that the shield D is extended upward above the spiked roller. This is for the purpose of directing the cobs of corn, placed on the hopper $k$, into the space between the roller and the shield. The blower is driven by a belt, passing over the pulley L on the shaft B, and the sieve frame is agitated by means of an eccentric M on the same shaft, acting in conjunction with the rods N and P and the bell crank levers $q$.

R is the main driving shaft, turning in suitable boxes on the frame, and motion is communicated from this shaft to the shaft B, through the intervention of the wheel S and pinion T.

In shelling corn, the ears are placed in the hopper $k$, from whence they roll between the shield and the spiked roller, by the combined action of which, the kernels are stripped from the cobs, a portion of the former dropping through the slots in the shield onto the inclined plane $g$, another portion, with the stripped cobs, being discharged from the end of the shield onto the same inclined plane, from whence the whole pass onto the middle sieve $d$, the chaff being blown out, the stripped cobs falling to the ground at the rear of the machine, and the kernels dropping, through the meshes of the sieve $d$, onto the finest sieve $i$, thence onto the inclined plane J, rolling down the latter and through the opening $h$, to the ground in front of the machine.

When used for cleansing grain, the latter is placed in the hopper F, from whence it falls onto the inclined plane e, and thence onto the upper sieve c, from whence it passes through the meshes to the middle sieve d, when the chaff is blown out at the rear of the machine, the grain falling, through the meshes of the middle sieve, onto the lower sieve i, through which the "cockle" and other refuse matter passes, while the grain rolls down the inclined plane J, and out at the opening h to the ground.

It will now be seen without further description that by the peculiar arrangement of the slotted shield D and spiked roller c in respect to the sieve frame E blower G and inclined plane J the machine can be used either for the shelling of corn or cleansing of grain.

I do not claim broadly combining a grain fan and a corn sheller in one instrument; but I claim and desire to secure by Letters Patent.

Arranging the spiked roller C and the slotted shield D of a corn sheller on the frame of a grain fan in respect to and in combination with the sieve frame E blower G and inclined plane J of the said grain fan in the manner herein described so that the said blower sieve frame and inclined plane may serve the purpose of separating the cobs from the shelled kernels of corn and the latter from the chaff and other refuse.

In testimony whereof, I have signed my name to this specification before two subscribing witnesses.

HAMILTON E. SMITH.

Witnesses:
    HENRY HOWSON,
    HORACE SEE.